United States Patent [19]

Morbieu

[11] Patent Number: 5,648,604
[45] Date of Patent: Jul. 15, 1997

[54] METHOD AND SYSTEM FOR DETERMINING ANEMOBAROCLINOMETRIC PARAMETERS ON BOARD AN AIRCRAFT

[75] Inventor: Bertrand Morbieu, Bordeaux, France

[73] Assignee: Sextant Avionique, Meudon La Foret, France

[21] Appl. No.: 531,300

[22] Filed: Sep. 20, 1995

[30] Foreign Application Priority Data

Sep. 22, 1994 [FR] France ................................ 94 11309

[51] Int. Cl.⁶ ............................................ G01C 21/20
[52] U.S. Cl. ............................................ 73/181; 73/178 R
[58] Field of Search ................................ 73/181, 178 R

[56] References Cited

U.S. PATENT DOCUMENTS

| | | | |
|---|---|---|---|
| 4,608,641 | 8/1986 | Snell | 73/178 R X |
| 5,001,638 | 3/1991 | Zimmerman et al. | 364/424.06 |
| 5,055,692 | 10/1991 | Abbiss et al. | |
| 5,423,209 | 6/1995 | Nakaya et al. | 73/182 |

FOREIGN PATENT DOCUMENTS 2123240  1/1984  United Kingdom.

OTHER PUBLICATIONS

"Four-beam two-focus differential laser velocimetry", Yin et al, *Optical Engineering*, vol. 31, No. 8, 1992.

*Primary Examiner*—Elizabeth L. Dougherty
*Assistant Examiner*—Joseph L. Felber
*Attorney, Agent, or Firm*—Russ, August & Kabat

[57] ABSTRACT

The invention is a method for determining anemobaroclinometric parameters on board an aircraft.

The air speed vector (Vp), the static pressure (Ps), and the impact temperature (Ti)
are measured, and the other parameters are calculated on the basis of the aforementioned measurements.

7 Claims, 2 Drawing Sheets

METHOD AND SYSTEM FOR DETERMINING ANEMOBAROCLINOMETRIC PARAMETERS ON BOARD AN AIRCRAFT

BACKGROUND OF THE INVENTION

The present invention concerns a method and system for determining anemobaroclinometric parameters on board an aircraft.

Present-day anemometry on board aircraft is based on the measurement of parameters relating to air, such as static pressure, total pressure and impact temperature, assisted by probes and sensors.

The probes are protuberant devices on the skin of the aircraft, which therefore have a certain number of drawbacks.

From the point of view of aerodynamics, the probes disturb the flow of air and can interfere with the engine air intakes. They also increase drag.

From the electromagnetic point of view, they generate a radar signature which undermines the stealth of the aircraft, and require de-icing, which undermines infrared concealment and consumes energy.

The measurements are, moreover, carried out locally in aerodynamically disturbed areas and therefore necessitate significant corrections, which are modelled during flight trials but which do not afford all the precision desirable in all fields of flight (for example in post-stalling).

Notwithstanding a high precision of measurement in the sensors, the performance of the anemobaroclinometric function is impaired by non-reproducibility phenomena and wearing of the probes, and is limited by residual modelling errors.

Increased operational constraints of stealth and maneuverability are pushing current anemometry to its limits. If the protuberance of the probes is to be eliminated in order to satisfy the constraints of stealth, the modelling complexity then becomes all the more tricky if the aircraft is also to be maneuverability.

The present invention aims to overcome these drawbacks.

To this end, the object of the invention is, first of all, a method of determining anemobaroclinometric parameters on board an aircraft, characterized by the fact that measurements are made of:

the air speed vector (Vp);
the static pressure (Ps);
the impact temperature (Ti);

and that the other parameters are calculated on the basis of the aforementioned measurements.

It will, indeed, be seen hereinafter that all the parameters can be obtained on the basis of the three aforementioned measured parameters.

The choice of these three parameters has the advantage that they can he obtained by non-protuberant probes.

In particular, the air speed vector can be measured by means of longitudinal laser anemometry.

Doppler longitudinal anemometry proceeds by measuring the Doppler shift f to which a monochromatic light wave of wavelength $\lambda$ is subjected when it is backscattered by aerosols in suspension in the atmosphere. This shift equals $\Delta f=2v/\lambda$, where V designates the component of the air speed vector along the sight line.

The measurement of the Doppler shift therefore gives the component of the air speed vector through a rigorously linear law in the speed range in question, and whose scaling factor depends only on the wavelength of the laser, which is generally known with high precision and does not change over time. At a wavelength of 2 μm, the scaling factor is approximately 1 MHz per m/s.

The measurement is carried out at several tens of meters (50 to 100 meters) upstream of the aircraft in an undisturbed area within a measurement volume whose typical length is around ten meters.

The three components of the true air speed vector can be obtained by means of several sight lines. The measurement areas on the various axes are then discontinuous but their distance is less than the scale of atmospheric turbulence.

Although Doppler longitudinal anemometry has the advantage of measuring the air speed in a non-disturbed aerodynamic area, it is possible to use other optical methods which do not use a protuberant probe.

Thus a fringing laser anemometer, or a so-called "twin-layer" or "flight-time" anemometer could be used.

It is theoretically possible to measure the speed vector projection moduli of only over three measurement axes, but a redundant measurement over four axes is preferably used.

If a measurement of the conventional type is also made of the ground speed vector, the wind vector can be derived therefrom, since the air speed vector is known.

Knowledge of the wind speed vector is thus of particular interest: it is in fact possible, between two successive determinations of the true air speed vector, to determine an air speed vector calculated on the basis of the ground speed vector and the last wind vector obtained.

Another object of the present invention is an anemobaroclinometric system for implementing the method described above, characterized by the fact that it comprises at least one means of measuring the air speed vector (Vp), at least one means of measuring static pressure (Ps), at least one means of measuring the impact temperature (Ti), and at least one computer set up to calculate the other anemobaroclinometric parameters on the basis of the air speed, static pressure and impact temperature.

In a preferred embodiment, the means of measuring the air speed comprise two longitudinal laser anemometers with four axes of measurement.

Advantageously, three computers are provided, each receiving the eight speed projection measurements, at least one static pressure measurement and at least one impact temperature measurement.

BRIEF DESCRIPTION OF THE DRAWINGS

A particular embodiment of the invention will now be described by way of non-limitative example, with reference to the accompanying drawings in which.

DETAILED DESCRIPTION OF THE PREFERRED EMBODIMENT

Figure 1:
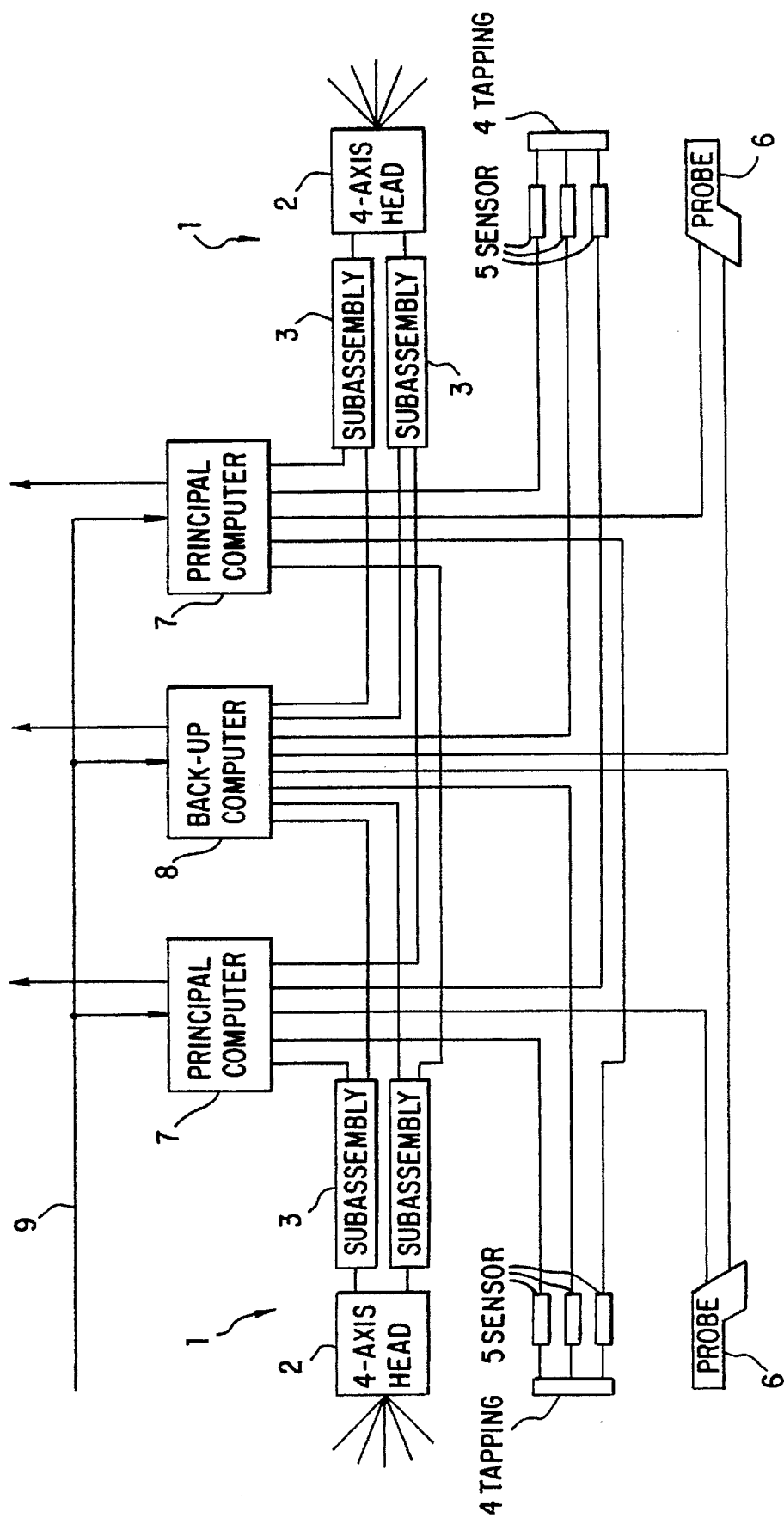
FIG. 1 illustrates the architecture of the system according to the invention.

The system depicted in FIG. 1 includes two laser anemometers 1 with four axes of measurement. Each laser anemometer comprises a laser, a 4-axis head 2 on which the beams are switched in pairs, and two axis processing sub-assemblies 3 (calculation of speed vector projections). The principles of Doppler longitudinal anemometry being known in themselves, the anemometers 1 will not be described in greater detail.

The system also includes two static pressure tappings 4 with three pressure orifices, each associated with a sensor 5.

Finally, two impact temperature probes 6 are disposed in the engine air inlets and are therefore masked, each temperature probe having two measurement elements.

Two computers 7 each receive eight speed projections corresponding to two laser anemometers, an impact temperature measurement and two static pressure measurements, one corresponding to the right-hand side and the other to the left-hand side of the aircraft. In nominal mode, these computers 7 each supply a set of air parameters with an indication of the integrity of the measurement of the air speed vector.

A back-up computer 8 calculates the same parameters from the 8 air speed projections, from two measurements of static pressure and from two measurements of impact temperature.

The three computers 7 and 8 also receive at 9 the data required in order to calculate the ground speed. These data can come from any known means, such as an inertial unit, satellite navigation equipment (GPS) or Doppler radar.

The computers 7 and 8 determine the anemobaroclinometric parameters in the following manner.

The static pressure Psm, as locally measured, must be corrected as a function of the air speed vector Vp and the static temperature Ts, to obtain the true static pressure measured infinitely far upstream from the aircraft. This correction model, determined during in flight trials, can be written in the form of a correction law of the type $$Ps = f(Vp, Ts, Psm)$$

or $$Ps = f(\overline{Vp}, Ts, \text{measured Ps})$$

The total temperature is derived from the impact temperature Ti on the basis of a correction law also defined by flight tests $$Tt = g(\overline{Vp}, Ps, Ti)$$

The above two equations enable the static pressure Ps and the total temperature Tt to be derived form measurements of Vp, measured Ps and Ti.

Figure 2:
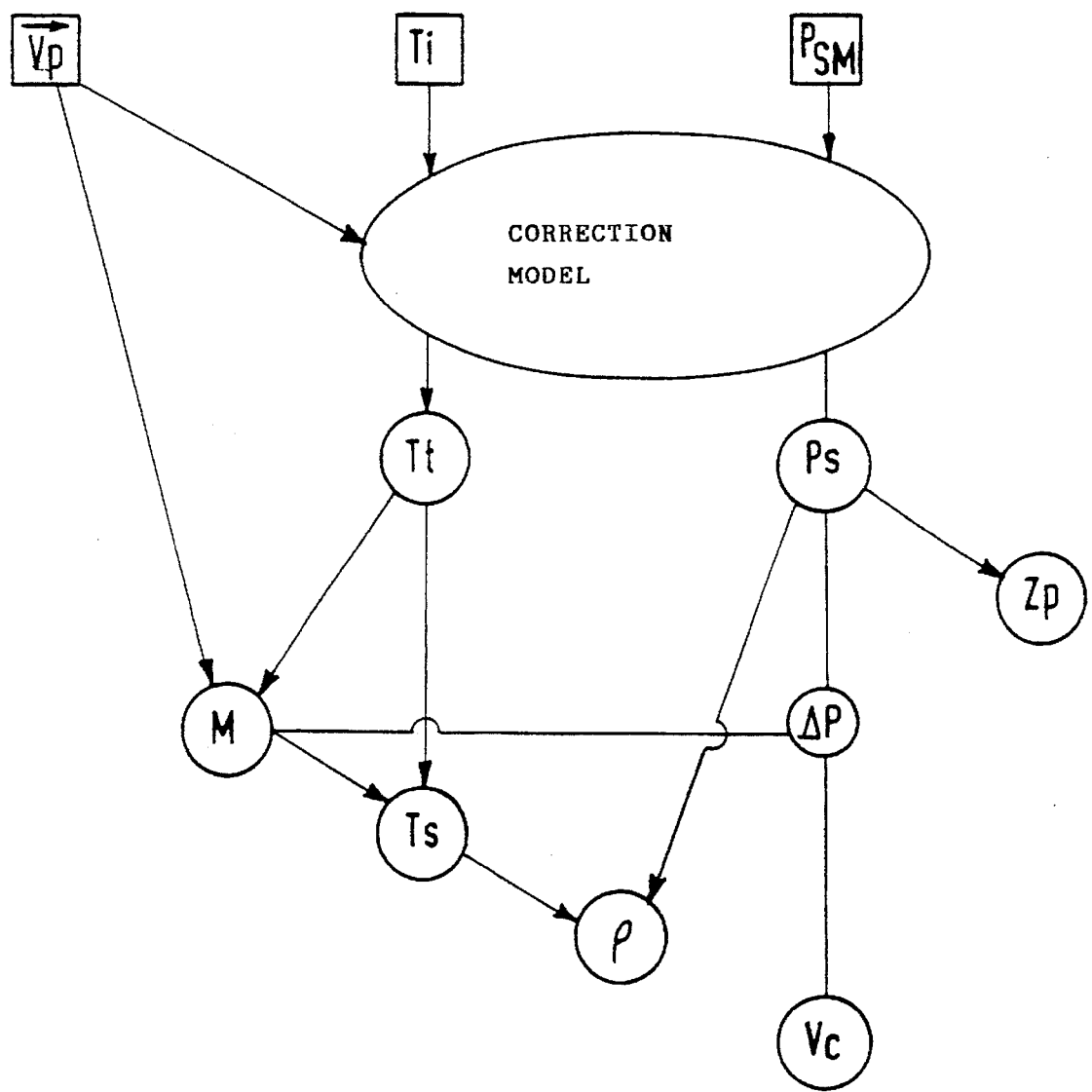
FIG. 2 is a diagram of the steps in the method according to the invention.

The other parameters are then obtained as depicted in FIG. 2, in which the squares correspond to measurements and the circles to output information.

The Mach number is derived from the true air speed and from the total temperature by the relationship $$M = \frac{Vp}{Ko\left[Tt - 0.2\frac{Vp^2}{Ko^2}\right]^{1/2}}$$

The static temperature is derived from the total temperature and from the Mach number by the relationship $$Ts = \frac{Tt}{1 + 0.2M^2}$$

The density and the altitude pressure Zp are determined in a known manner on the basis of Ps and Ts.

The total pressure is calculated using the Mach number and the static pressure in accordance with Saint-Venant and Rayleigh formulae.

$$Pt = Ps\,(1 + 0.2M^2)^{3.5}$$

M>1: Rayleigh's formula $$Pt = Ps \frac{(1.2M^2)^{3.5}}{\left(\frac{7M^2 - 1}{6}\right)^{2.5}}$$

The calibrated speed is calculated by mesas of the relationships $$\Delta p = Pt - Ps$$
$$\Delta p \leq 904.76 hPa$$

$$Vc = 760.92\left[\left(\frac{\Delta P}{1013.25} + 1\right)^{2/7} - 1\right]^{1/2}$$

$$\Delta p \geq 904.76 hPa$$

$$\Delta p = 1013.25\left[\frac{3.1588 \cdot 10^{-16}\,Vc^1}{(6.0449 \cdot 10^{-3}\,Vc^2 - 1)^{2.5}} - 1\right]$$

Pt is the total pressure

Ps is the static pressure

M is the Mach number

Δp is the difference Pt–Ps

Vc is the calibrated speed

Tt is the total temperature

Zp is the altitude pressure computed as a function of Ps and Ts

Ts is the static temperature p is the mass per unit volume (the density)

Ko is a constant factor determined experimentally.

The system operates in nominal mode when the data delivered by the two principal computers 7 are identical. In this case, the data delivered by the computer 8 are not taken into account.

If one of the principal computers 7 does not have an integrated air speed vector, this item of data is not retained and the data delivered by the other principal computer 7 are compared with the data delivered by the back-up computer 8. The system still operates nominally if there is at least one integrated air speed vector, a static pressure result common to two computers, and an impact temperature result common to two computers.

In other cases, the integrity of the system is not guaranteed, and the aircraft is piloted in degraded mode.

The data supplied by the input 9 allow a hybridization, relying on the fact that, in the short term (a few seconds), the local wind has a constant value and it is possible to estimate the true air speed vectors at a time to +τ on the basis of an air speed measurement at time to and a ground speed measurement.

It is then possible to supply estimations of the air speed vector between two measurements, which contributes to an increase in the bandwidth of the air speed data.

I claim:

1. A method for determining the anemobaroclinometric parameters on board an aircraft, characterized by the fact that measurements are made of:

an air speed vector (Vp);

a static pressure (Ps); and an impact temperature (Ti);

wherein additional parameters are calculated on the basis of the aforementioned measurements and wherein said air speed vector Vp is measured by means of Doppler longitudinal anemometry.

2. A method according to claim 1, in which a speed vector projection moduli are measured over four measurement axes.

3. A method according to claim 1, in which a ground speed vector is also measured, and a wind vector is derived therefrom.

4. A method according to claim 3, in which, between two successive determinations of a true air speed vector, a calculated air speed vector is determined, on the basis of the ground speed vector and the last wind vector.

5. An anemobaroclinometric system for implementing the method according to claim 1 characterized by the fact that it comprises at least one means (1) of measuring the air speed vector (Vp), at least one means (4) of measuring static pressure (Ps), at least one means (6) of measuring the impact temperature (Ti), and at least one computer (7) set up to calculate at least anemobaroclinometric parameters Ps, Zp, $\Delta P$, M, Ts and Vc on the basis of the air speed vector, static pressure and impact temperature, where Zp is the altitude pressure as a function of Ps and Ts $\Delta P$ is the difference of total pressure minus Ps M is the Mach number Ts is the static temperature Vc is the calibrated speed.

6. A system according to claim 5, in which the means of measuring the air speed comprise two longitudinal laser anemometers with four measurement axes.

7. A system according to claim 6, including three computers, each receiving the eight speed projection measurements, at least one static pressure measurement and at least one impact temperature measurement.

* * * * *